United States Patent
Li et al.

(10) Patent No.: US 12,118,022 B2
(45) Date of Patent: Oct. 15, 2024

(54) METHOD AND SYSTEM FOR INITIATING A LOCATION-BASED TOPIC

(71) Applicant: Framy Inc., Grand Cayman (KY)

(72) Inventors: Yu-Hsien Li, Taipei (TW); Shi-Ting Li, Taipei (TW); Chia-Yuan Cheng, Taipei (TW)

(73) Assignee: FRAMY INC., Grand Cayman (KY)

( * ) Notice: Subject to any disclaimer, the term of this patent is extended or adjusted under 35 U.S.C. 154(b) by 67 days.

(21) Appl. No.: 17/949,335

(22) Filed: Sep. 21, 2022

(65) Prior Publication Data

US 2023/0137068 A1 May 4, 2023

(30) Foreign Application Priority Data

Oct. 29, 2021 (TW) ................................ 110140218

(51) Int. Cl.
*G06F 16/29* (2019.01)
*G06F 16/9537* (2019.01)
*G06F 16/957* (2019.01)

(52) U.S. Cl.
CPC .......... *G06F 16/29* (2019.01); *G06F 16/9537* (2019.01); *G06F 16/957* (2019.01)

(58) Field of Classification Search
CPC .. G06F 16/958; G06F 16/957; G06F 16/9537; G06F 16/29
USPC .......................................................... 707/741
See application file for complete search history.

(56) References Cited

U.S. PATENT DOCUMENTS

| | | | |
|---|---|---|---|
| 2015/0073709 A1* | 3/2015 | Huang | G01C 21/28 701/537 |
| 2016/0116292 A1* | 4/2016 | An | H04W 4/025 701/454 |
| 2017/0061294 A1 | 3/2017 | Weston et al. | |
| 2019/0268650 A1* | 8/2019 | Avedissian | G06F 3/0481 |

FOREIGN PATENT DOCUMENTS

TW     201923549 A     6/2019

OTHER PUBLICATIONS

Mikal E. Belicove, "Put Your Business on the Map with Google Maps", Entrepreneur, Mar. 25, 2010(Mar. 25, 2010), pp. 1-3,https://www.entrepreneur.com/money-finance/put-your-business-on-the-map-with-google-maps/218666.
Todd Webber and Bob Weins,"Put Your Business on the Map With Google Maps", Journal of Accountancy,Jun. 2009(Jun. 2009), pp. 1-8,http://www.billseabrookecpa.com/resources/putyourbusinessonthemapwithgooglemaps.pdf.

* cited by examiner

*Primary Examiner* — Kuen S Lu
(74) *Attorney, Agent, or Firm* — Li & Cai Intellectual Property (USA) Office

(57) ABSTRACT

A method and a system for initiating a location-based topic are provided. The system includes a serving system that allows a user to initiate the location-based topic within a social media and a graphical user interface initiated in a user device through a software means. The method allows the user to initiate a topic page when browsing digital contents in the social media via the graphical user interface. Besides being able to browse various location-based topics created by other users and the responses, the user himself can also create a location-based topic provided for other users to browse and respond to. Through web and computer technology, the serving system allows the user to browse the various digital contents via the social media and interact with other users through the various location-based topics.

10 Claims, 11 Drawing Sheets

METHOD AND SYSTEM FOR INITIATING A LOCATION-BASED TOPIC

CROSS-REFERENCE TO RELATED PATENT APPLICATION

This application claims the benefit of priority to Taiwan Patent Application No. 110140218, filed on Oct. 29, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for interacting on a social media, and more particularly to a method and a system for initiating a location-based topic on the social media via a graphical user interface having a map as a background.

BACKGROUND OF THE DISCLOSURE

In addition to traditional media, the Internet has gradually become a major source of information for the public. A network forum is one of the information sources on the Internet. The network forum allows users to ask questions, and other users can determine whether or not to anonymously reply to the questions. The various replies become the sources for the public to acquire information on the Internet.

With rapid development of network applications and social media, social media platforms are provided by various social media for users to interact online. In addition to being allowed to upload audiovisual contents to the social media platform, the users can browse and search for the audio and video contents of interest on the social media platform, and the users can also interact with other users through posts and replies.

In conventional social media technologies, the social media platform collects activity data of the users and learns the interests of each of the users. Accordingly, the social media platform can recommend to each user audio and video contents that match with the interests of this user, so as to increase stickiness between the users and the social media platform.

Various contents can be shared by the users across various social media platforms. However, in addition to matching the users with the audiovisual contents that they may be interested in, the social media platforms still need to provide an environment of operation that allows the users to establish location-based contents.

SUMMARY OF THE DISCLOSURE

In response to the above-referenced technical inadequacies that the conventional technologies lack a community service allowing a user to establish a location-based topic, the present disclosure provides a method and a system for initiating a location-based topic. The method is operated in a serving system. In the method, when a user initiates a location-based topic via a browser program executed in a user device, the serving system receives a signal of initiating the location-based topic via the browser program, and a location-based topic data is established in a database of the serving system. The database records correlations between the location-based topics and geographic information and also the correlations between the location-based topics and user IDs. Afterwards, based on the geographic information, a link of the location-based topic can be marked on a user interface of the user device.

Further, when the user device transmits the geographic information to the serving system, the serving system queries a database according to the geographic information in order to obtain one or more location-based digital contents within a geographic range. Therefore, linking icons of the location-based digital contents and the links of the location-based topics marked on the user interface of the user device are provided.

Preferably, the system uses the browser program to display a prompt message that prompts the user to establish a location-based topic on the user interface. A topic page can be started after the user clicks on the prompt message. The topic page allows the user to input geographic information and a topic content so as to initiate the location-based topic. If a location-based topic page is entered by selecting a link of a location-based topic, the serving system pushes a content of the location-based topic and one or more replies to the user device according to a result of matching a user preference.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
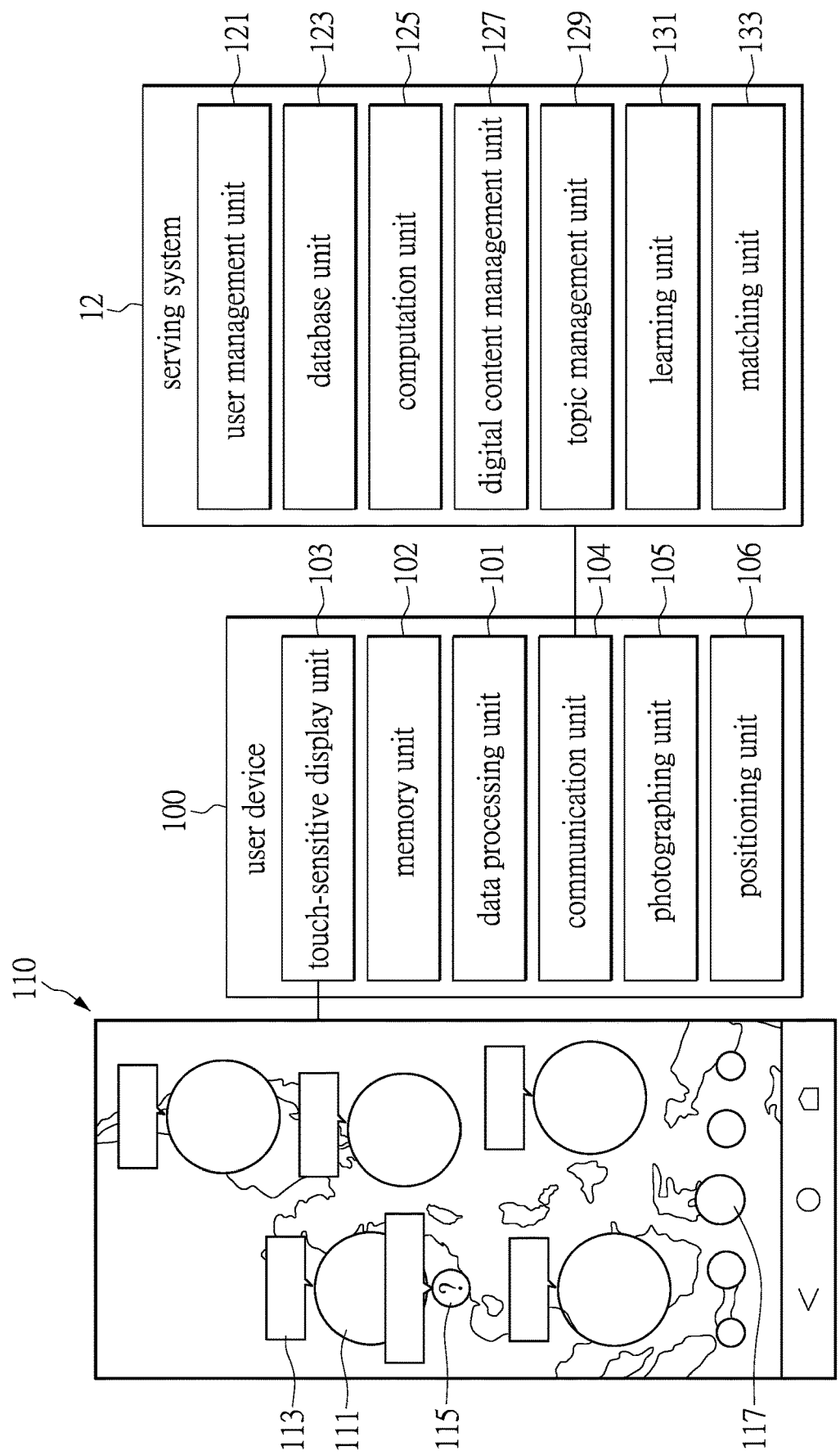
FIG. 1 is a schematic diagram depicting a framework of a system for initiating a location-based topic according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure relates to a method and a system for initiating a location-based topic, in which the method is adapted to applications in a social media. When a user uses a browser program to browse a plurality of digital contents that can be videos, audios, pictures and texts uploaded by other users of the social media from various places, the system provides a plurality of location-based digital contents within a location range to the user. The system marks the location-based digital contents uploaded by the users within the location range on a user interface, furthermore, one or more hashtags, e.g., a prefix with a symbol "#", tagged on the digital contents when the digital contents are uploaded are used to recommend the location-based digital contents to the user. The hashtags can be relevant to the digital contents that are trending, popular, having a lot of views, and/or matching with a user preference in the location range. Furthermore, the browser program executed in the user device can be an application for browsing a social media, a web browser, or a mobile application executed in a mobile device. The method for initiating a location-based topic enables the user to browse and establish topics that associate with specific locations. The location-based topics can be the topics to be established for interacting with other users on the social media. In some embodiments, the location-based topics can be based on a user preference.

Reference is made to FIG. 1, which is a schematic diagram depicting a framework of the system for initiating a location-based topic according to one embodiment of the present disclosure. In the diagram, a serving system 12 is provided for serving digital contents to various user devices (not shown in the diagram) via a network. In an aspect of the present disclosure, the serving system 12 is to provide digital contents via a social media so that the user devices can obtain links of the digital contents via the network. In each of the user devices, a software procedure is executed to dynamically display digital contents according to changes in location. The software procedure is able to link to the serving system 12 to receive the links of the digital contents, obtain the digital contents according to requirements, so that the digital contents can be browsed and played. Particularly, the links of the digital contents can be displayed as pictures using scenes of specific scenarios or an electronic map, such as the graphical user interfaces 110 that are exemplarily shown on the screens of the user devices 101 and 103, respectively. The serving system 12 and software programs executed in the user devices embody the system that implements the method for initiating a location-based topic.

The user device is such as a user-end mobile device that has a touch screen allowing the user to operate the user device by gestures of fingers. The user can use gestures to decide to browse a display area and select a linking icon that can be a user-linking icon or a point of interest (POI) linking icon marked on a browsing page via the software programs executed in the user device. After the linking icon is selected, a playback page is initiated by the software programs to play the digital contents associated to the selected linking icon. The graphical user interface 110 shown in the diagram uses an electronic map as a background. A plurality of linking icons 111 correlated to geographic locations and the description 113 that are related to and near each of the linking icons 111 are shown on the graphical user interface 110. The user can click on one of the linking icons 111 and play the digital content linked to the linking icon 111 that is clicked on. Furthermore, a row of page-switching thumbnails 117 are provided for the user to quickly switch to a different display area. Further, the serving system 12 searches the location-based topics within a geographic range according to the display area browsed by the user. A plurality of location-based topic linking icons 115 are then generated and shown on the graphical user interface 110.

Multiple functional elements are implemented in the serving system 12 by using software or through cooperation of software and hardware. One of the functional elements implemented in the serving system 12 is a user management unit 121 that is used to manage the users that provide the digital contents to the serving system 12. The user management unit 121 allows the user to browse and play the digital contents after the user passes identity authentication. The user management unit 121 also stores the records of using digital contents in the serving system 12 of each of the users, the digital contents and the location-based topics that the users create, and activity records of the users in the relevant social media.

The serving system 12 includes a database unit 123 that can be a database. A plurality of user identification data (e.g., multiple user ID) of multiple users and files of digital contents uploaded by the users are stored in the database. Particularly, the digital contents are location-based topics and responses. Each of the digital contents and the location-based topics has a database address in the database unit 123, that is, each of the digital contents and the location-based topics in the display area is linked to a corresponding database address of a physical file. The database unit 123 allows a software procedure in the user device to query the database based on the display area. Preferably, by querying the database of the serving system 12, a plurality of linking icons 111, linking content descriptions 113 and location-based topic linking icons 115 shown on the graphical user interface 110 can be obtained. In detail, the digital contents associated to the display area, a linking address of each of the digital contents, coordinates of each of the digital contents and hashtags within the display area, a score of each of the digital contents, the location-based topics, and the coordinates associated with the location-based topics in the display area can be obtained by querying the database.

The serving system 12 includes a computation unit 125 that is a circuit for processing data such as a geographic coordinate range of a display area, a linking address of the digital content or the location-based topic, digital contents and locations associated to the linking icon, display content to be refreshed, and a score of digital content provided by each of the user devices.

The digital content management unit 127 is used to process the digital contents that are uploaded and downloaded. The digital contents can be stored to a database. A database address corresponding to the digital contents and the coordinates of the linking icon are calculated and stored to the database, along with data of the authoring user of the digital contents. A topic management unit 129 is used to manage the location-based topic initiated by a user, the responses made by other users, and various interactive messages with respect to the location-based topic. The location-based topics, the responses corresponding to each of the topics, and the relevant interactive messages are stored in the database. The topic management unit 129 calculates a database address corresponding to each of the location-based topics and the related contents. The database address allows the user to browse the location-based topics within a browsing range. Further, a sequence of the multiple location-based topics and the contents of the location-based topics are calculated and pushed to the user based on the user preference.

The graphical user interface 110 can show an electronic map. The linking icons 111 of the digital contents and the location-based topics are displayed at certain locations in the display area according to corresponding geographic coordinates on which the digital contents and the location-based topics are generated. The linking icons 111 of the location-based digital contents can be used as representative images of the links which is a collection of a plurality of location-based digital contents. The linking icon can be a thumbnail of the digital content, or a profile image or a picture of a user that produces the digital content. The diagram shows a location-based topic linking icon 115 that is linked to contents relevant to a specific location-based topic. The linking icon 115 can be a question mark icon accompanied with a textual description that attracts the user to click on the location-based topic linking icon 115 to enter a topic page.

The score of the digital content can be obtained according to various scoring factors provided by the serving system, and the digital content is scored by the serving system based on a number of creations of an authoring user of the digital content, a number of followers of the digital content, a number of times the digital content is played, a rating, a creation time of the digital content, or a personal preference of the user viewing the digital content, or any combination thereof. Furthermore, in practical implementations, the scoring factors are not limited to items listed above.

The serving system 12 implements a learning unit 131 by a learning algorithm that learns the features from the contents created by the users, the browsed content, and interactions made by the user in the digital contents and location-based topics for establishing a user preference. A matching unit 133 is provided for the serving system to prioritize providing the digital contents and location-based topics that match with the user preference. Furthermore, the contents provided to the user may be sorted according to results of matching if the quantity of the digital contents or the location-based topics reaches a certain number.

At the user-end, the user manipulates a user device to connect with the serving system 12 for accessing the digital contents and the location-based topics of the serving system 12. The user device can be a portable device such as a smart device held or carried by the user. The user device includes a data processing unit 101 for processing data, and a memory unit 102 that is a storage media of the user device. The memory unit 102 can be used to temporarily store the digital contents downloaded from the database unit 123 of the serving system 12, and store the data (e.g., the one or more hashtags) relevant to the digital contents and linking icons.

The user device includes a touch-sensitive display unit 103 that is, but not limited to, a circuit allowing the user to operate and decide the display area, and a communication unit 104 that is a circuit allowing the user device to connect to an external device such as the serving system 12 for data transmission. After establishing a connection, the user device can transmit and obtain the information relevant to the digital content and the location-based topic and download the digital content or the location-based topic according to a link.

The user device includes a photographing unit 105 that is a circuit allowing the user to produce the digital content by operating the user device. Furthermore, the user device includes a positioning unit 106 that is used to generate positioning data of the user device. The positioning unit 106 is such as a receiver of the global positioning system (GPS). Data of the GPS is used for positioning the user device. When the positioning unit 106 of the user device generates the positioning data and the touch-sensitive display unit 103 displays a display area of a certain coordinate range, the data can be transmitted to the serving system 12 via the communication unit 104. The serving system 12 then responds to these data by transmitting links of the digital contents associated to the display area to the user device. Through a software procedure operated in the user device, the linking icon to be displayed is determined. The graphical user interface 110 is provided for the user to select one of the linking icons, play the digital contents, and join one of the location-based topic forums.

The display area is such as an electronic map, or a user interface having a simulated scenario. Particularly, the linking icons associated with the digital contents or the location-based topics are displayed on the display area in a non-uniform arrangement. For example, in the electronic map, the serving system 12 relies on a location of the user or a specific location decided by the user to provide the contents for the user.

Figure 2:
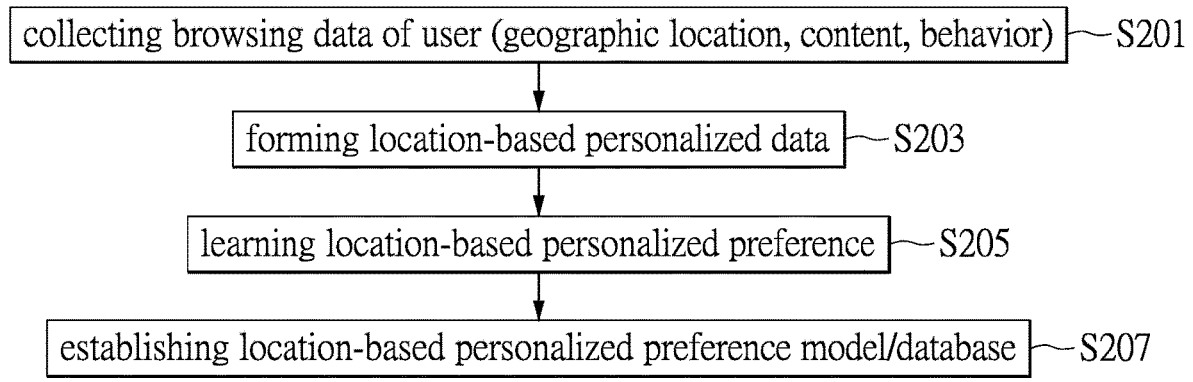
FIG. 2 is a flowchart illustrating a process of forming a user preference in a method for initiating a location-based topic according to one embodiment of the present disclosure.

Reference is made to FIG. 2, which is a flowchart illustrating a process of forming the user preference in the method for initiating a location-based topic according to one embodiment of the present disclosure.

According to one of the embodiments, such as in step S201, the serving system gathers activity data such as browsing data of the user, user-generated contents, and the relevant location-based topics through a browser program executed in a user-end computer device. The features of the activity data are correlated to the geographic location. In an exemplary example, the user manipulates a mobile device that executes the browser program provide by the system. When the user arrives at a location, the user reports or produces a video, an audio, a picture, or a text within the geographic range by operating a program, e.g., the browser program. The video, the audio, the picture, or the text is then uploaded to the serving system after the user device is connected to the serving system. The content uploaded to the serving system includes metadata that at least records the geographic information and user identification data relevant to the content. It should be noted that the user identification data can be obtained by the serving system when the user logs on the system. In step S203, the serving system analyzes the uploaded content for forming the location-based personalized data that is stored in the database of the serving system.

In addition to establishing the database with the location-based contents, the serving system collects the activity data of the users over the network through software programs executed in the user-end computer devices. In step S205, the serving system can establish the location-based personalized data of the users according to the geographic information of various activity data. A machine-learning algorithm can be incorporated to the serving system to learn data features from the geographic data and weights with respect to the data features. In step S207, a location-based personalized preference model that is used to define each user preference is formed for each of the users. The data features may also be combined to constitute a location-based user preference. The serving system can accordingly rely on the user preference to provide one or more location-based personalized contents that include various digital contents and the location-based topics initiated in the method. It should be noted that, different weights are calculated and distributed to the data features learned through the machine-learning algorithm according to levels of relevance of the data features. Data feature with a higher relevance can be assigned with a higher weight, and data feature with a lower relevance can be assigned with a lower weight. Therefore, the user preference can be accurately described.

In one embodiment of the disclosure, the activity data collected by the serving system from the user-end computer devices includes activities on various social media, search records, followed contents, and browsed contents including hashtags of the contents, and time itineraries of the activities. For example, browsing records collected by the serving system can be cookies, copies, and history records kept in a web browser. The activities on a social media are such as actions of check-ins, search records, likes, shares, follows, and replies. In certain scenarios, the information relating to the activities may include records of geographic locations. The records of geographic locations may include the data of the related geographies and location-based media contents. Further, when determining a level of the user preference, the serving system considers the time spent, the period of time, the frequency and length of time spent by the user browsing the content, whether or not the user shares the content to other users, and whether or not the content is produced by the user. The serving system relies on these data to establish the location-based personalized preference model and the database. The serving system can therefore perform a sorting of preference when providing the location-based personalized contents to the user.

According to one embodiment, the serving system provides the contents to be browsed on an electronic map through the browser program executed in the end user computer device when the user browses the contents on the electronic map. Each of the contents links to a specific geographic location. When the user browses the contents, the serving system simultaneously gathers browsing records such as videos, audios, pictures, and/or texts from the user. Records generated include user identification data, geographic location or a geographic range (latitude and longitude), browsing contents, and activities (such as likes, bookmarks, shares). The records may also include tags and times assigned to the contents. The records can be references learned by a learning algorithm for constituting the user preference.

In one further embodiment of the disclosure, the browser program provided by the serving system acts as a user interface provided for the user to browse the contents. The browser program can be a web browser provided for the user to browse various contents. The content browsed by the user and the browsing record of the user may be marked with the geographic information so that the learning algorithm learns a location-based preference of the user.

Figure 3:
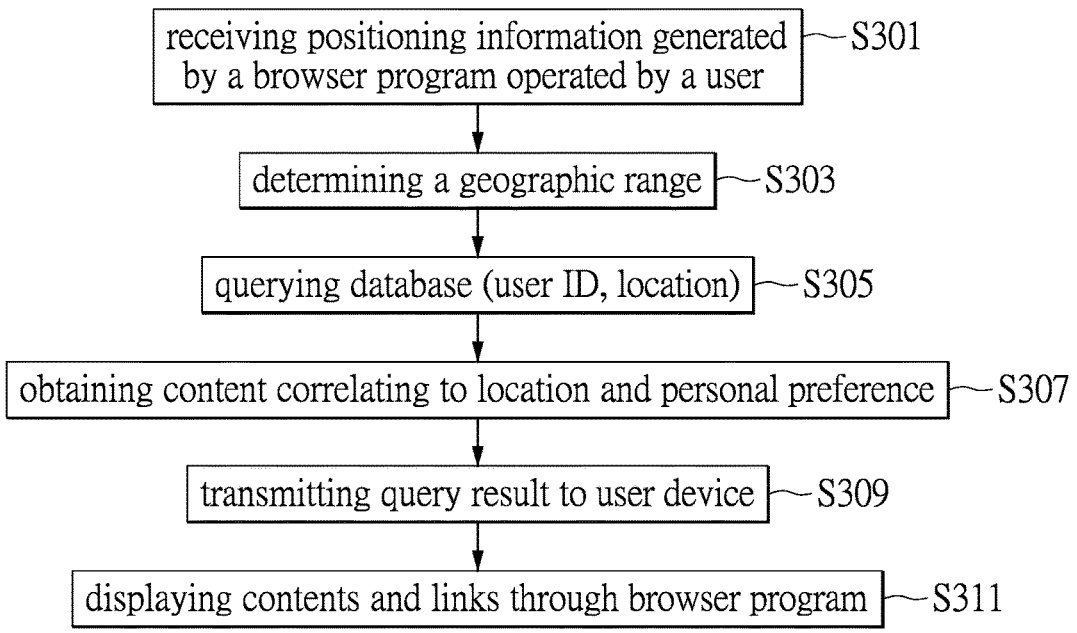
FIG. 3 is a flowchart illustrating a process of providing a location-based personalized content in one embodiment of the present disclosure.

When the analysis of the user preference is completed and the location-based personalized preference model and the database are established, the serving system accordingly provides the location-based personalized contents. FIG. 3 shows a flowchart illustrating a process of providing a location-based personalized content in one embodiment of the disclosure.

In the beginning, the user manipulates the browser program to browse the contents displayed on a graphical user interface that uses an electronic map as a background, or browses the contents containing geographic information displayed on a user interface that is not based on an electronic map. The graphical user interface includes links that link to videos, audios, pictures, and/or texts. The links can also be shown as pictures representing the user that can be clicked on. The contents linked to the links are the aforementioned location-based personalized contents. Particularly, the browser program may generate location information according to the geographic location browsed. For example, the browser program that may be based on an electronic map displays a map of a geographic range according to a geographic location. The location information sent to the serving system may represent a longitude and latitude of a central location of the geographic range (step S301).

In the serving system, the geographic range is determined according to the geographic location received from the end user computer device (step S303). According to one of the embodiments, when the user manipulates the browser program to browse a specific geographic location, the browser program transmits the geographic location or a relevant range to the serving system. The serving system can accordingly provide the location-based personalized contents to the user. In another embodiment, the browser program can be a video or text browser. Further, the content to be browsed through the browser program includes the information for the serving system to determine the geographic location. For example, the metadata of the content records the geographic information. Similarly, the serving system retrieves the location information of the contents from the browser program and accordingly provides the location-based personalized contents that may include one or more linking icons of the one or more location-based topics or information that prompt the user to create a location-based topic. In one further embodiment, the computer device manipulated by the user can be a mobile device, and the browser program executed in the mobile device can retrieve the location information from the signals generated by a sensor (e.g., a GPS sensor) or a wireless network module of the mobile device. The location information generated by the aforementioned schemes, after being sent to the serving system, allows the serving system to provide the location-based personalized contents according to the location of the mobile device.

In one application scenario, a software program executed in a computer device of the user allows the computer device of the user to link to the serving system, and the serving system receives the user identification data through the browser program when the user logs on to the system. The serving system can also obtain a browsing range of the user device so as to determine a geographic range. The serving system can provide the location-based personalized content (i.e., the digital content and/or location-based topic) based on this geographic range since the user preference may be changed with respect to changes in a size of the geographic range. Further, the quantity of contents provided to the user may also be changed due to restrictions such as limitations (a screen size and resolution, etc.) of the display.

Next, according to the data received from the user device, the serving system mainly queries the database according to the geographic range and/or the user identification data (step S305). It should be noted that, the database records videos, audios, pictures, texts and/or user-generated location-based topics that are uploaded by multiple users that use their devices to report or produce the location-based contents. In the serving system, correlations among the contents, the related geographic locations, and the user identification data are established. By querying the database, the location-based personalized preference model that is obtained by learning the user preference can be applied to the data received from the user device, so as to obtain the location-based personalized contents from the database (step S307). The location-based personalized contents are the data recorded in the database of the serving system, and a query result based on the geographic range and the user preference is in form of links to the location-based personalized contents and is transmitted to the user device (step S309). The browser program executed in the end user computer device, i.e., the user device, can accordingly mark the links and the contents (step S311). In an aspect of the disclosure, the location-based personalized contents may include a location-based and personalized advertisement provided by the serving system. At this time, if one location correlates to multiple location-based personalized contents that match with the conditions, i.e., the same geographic range and/or user preference, in one embodiment of the disclosure, the multiple links with respect to the contents can be sorted according to the user preference learned by the serving system and displayed on the electronic map. In one further embodiment, the links with respect to the location-based personalized contents sorted according to the user preference learned by the serving system can be displayed on a video or a text browser in a list or in a specific way. The links displayed in the list can be represented as texts, symbols, or icons marked on a user interface and sorted according to geographic addresses. The location-based personalized contents can be updated when the user modifies the browsed content and the geographic information generated by browsing the content.

Figure 4:
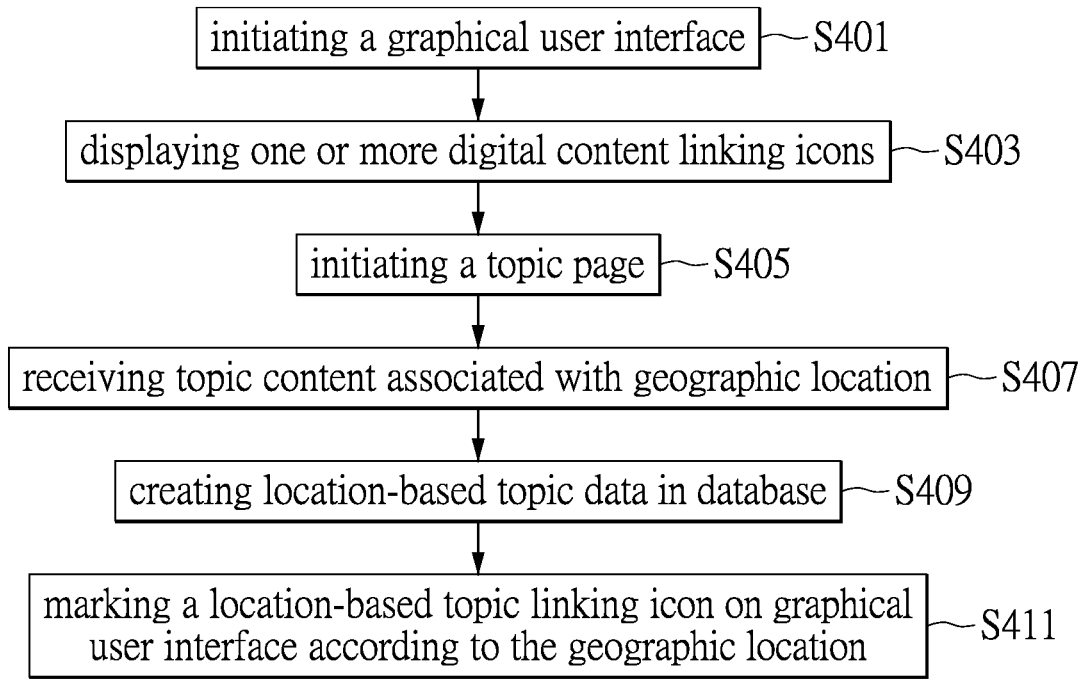
FIG. 4 is a flowchart illustrating the method for initiating a location-based topic as shown on a graphical user interface according to one embodiment of the present disclosure.

FIG. 4 is a flowchart illustrating the method for initiating a location-based topic as shown on a graphical user interface according to one embodiment of the present disclosure. Reference is also made to FIG. 8A to FIG. 8D according to one embodiment of the present disclosure. The user interface is preferably a graphical user interface that uses an electronic map as a background. In addition, a user interface in a manner of a list can also be used to display the various location-based topics.

When the user manipulates a browser program executed in the user device, such as step S401, the browser program connects to the serving system and initiates a user interface. The user interface can be the graphical user interface that uses an electronic map as a background. When the browser program connects with the serving system, a geographic data is transmitted to the serving system. The geographic data can be a current geographic location detected by a positioning circuit of the user device. The geographic data can also be the location information generated by the browser program when a geographic range is browsed by the user. In one embodiment of the present disclosure, the serving system can obtain user identification and display information of the user device from the browser program. The serving system can therefore provide the content that is personalized, location-based, and compatible with a display capability of the user device.

At this time, the serving system queries a database according to the geographic data, and compares results of the query with a display range calculated by the browser program executed in the user device. Afterwards, one or more location-based digital contents, the location-based topics, or the message that prompts the user to initiate the location-based topic within the display range are obtained. In step S403, one or more digital content linking icons corresponding to the one or more digital contents are marked on the user interface initiated by the user device. The linking icons can be thumbnails of the digital contents or pictures of the creators of the digital contents.

Figure 8A:
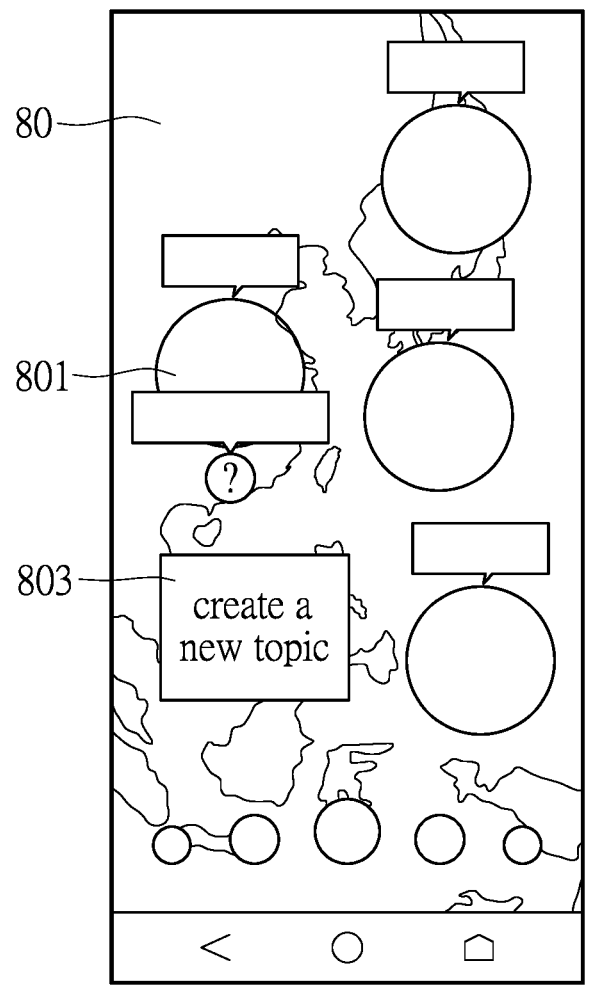
FIG. 8A to FIG. 8D are schematic diagrams depicting the graphical user interfaces for showing the process of initiating a location-based topic according to one embodiment of the present disclosure.
Figure 8B:
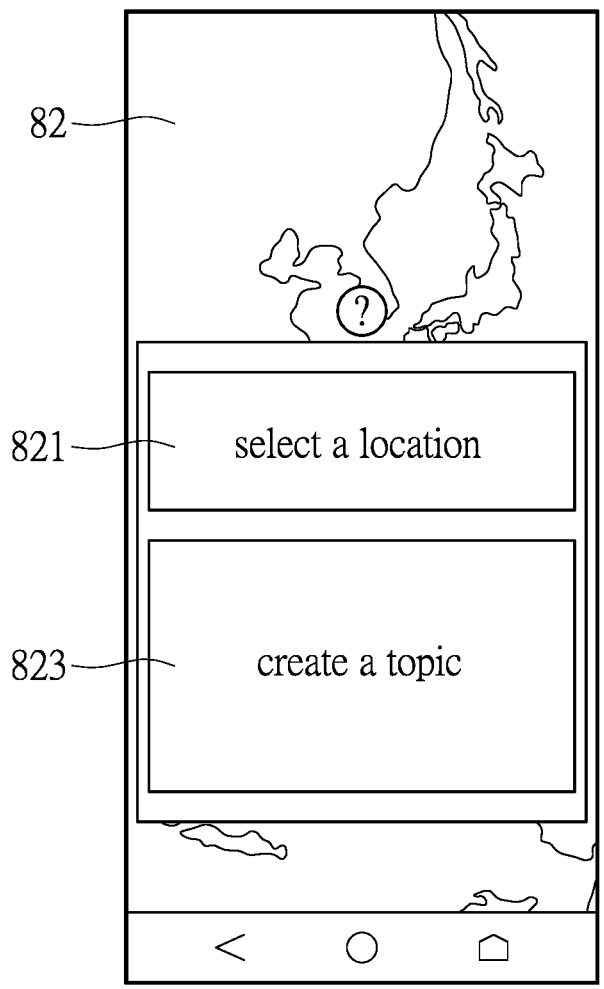

The browser program displays the prompt message on the user interface for prompting the user to initiate the location-based topic. Reference is made to FIG. 8A, which shows a user interface 80 that is a graphical user interface using an electronic map as a background. A plurality of location-based digital content linking icons 801 are shown on the user interface 80. The prompt message can be an image, a text, or an animation shown at a specific position of the user interface for prompting the user to initiate a location-based topic. In an exemplary example shown on the diagram, a prompt message 803 is displayed as "create a new topic." In step S405, when the user clicks on the prompt message 803, the browser program starts a topic page that allows the user to input geographic data and a topic content, that is, to initiate a location-based topic. FIG. 8B is a schematic diagram depicting a topic page in one embodiment of the present disclosure. A location-based topic page 82 is shown on the diagram, in which some fields on the topic page 82 are provided to prompt the user to select a location 821 and create a topic 823.

It should be noted that, the topic page includes a field for inputting a geographic data and another field for inputting a topic content. For example, the field for inputting the geographic data can automatically introduce the location information in the prompt message, or allow the user to input a location which is configured to mark the geographic location of the location-based topic. The topic content can be a question, opinion, or any message submitted by the user. The serving system utilizes an algorithm to analyze the topic content so as to classify the topic content. The classification of the topic content can be used for matching with the user preference in further applications.

Figure 8C:
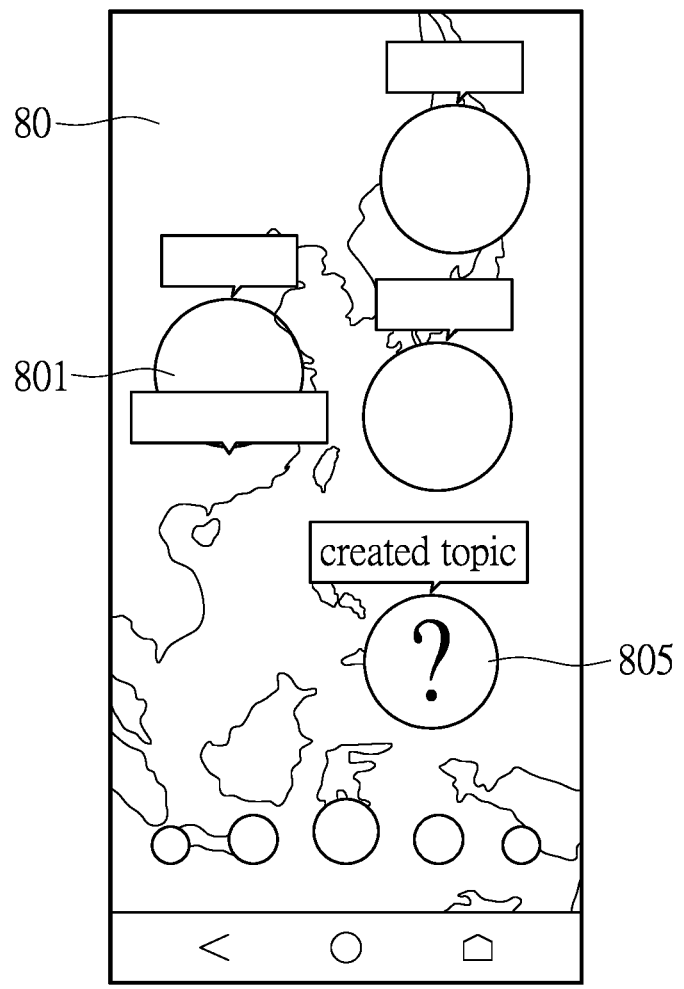

When the user uses a user device to initiate a location-based topic through the location-based topic page 82, the location-based topic at least correlates with a user ID and a geographic data. In step S407, the serving system receives a topic content correlated to a geographic data. Furthermore, in step S409, the serving system creates data of the location-based topic in the database, in which the data records the correlation between the location-based topic and the geographic data and the correlation between the location-based topic and the user ID. In step S411, by the browser program executed in the user-end computer device, a location-based topic linking icon is marked on the graphical user interface according to the geographic data correlated to the location-based topic. Referring to FIG. 8C, after the user creates the location-based topic, the serving system creates a location-based topic data in the database. A database index is used to link to a corresponding response such as a video, a text, and a picture to the location-based topic. The plurality of location-based digital content linking icons 801 within a display range are marked on the graphical user interface 80, and a location-based topic linking icon 805 with respect to the location-based topic created by the user is marked on the graphical user interface 80 based on a location set by the user.

Afterwards, when the user browses the geographic range having the location-based topic by the browser program, the serving system pushes one or more location-based digital content linking icons 801 within the geographic range to the browser program executed in the user device. The location-based topic linking icon 805 is also shown on the graphical user interface 80. The user can click on the location-based topic linking icon 805 to enter a relevant topic page.

Figure 8D:
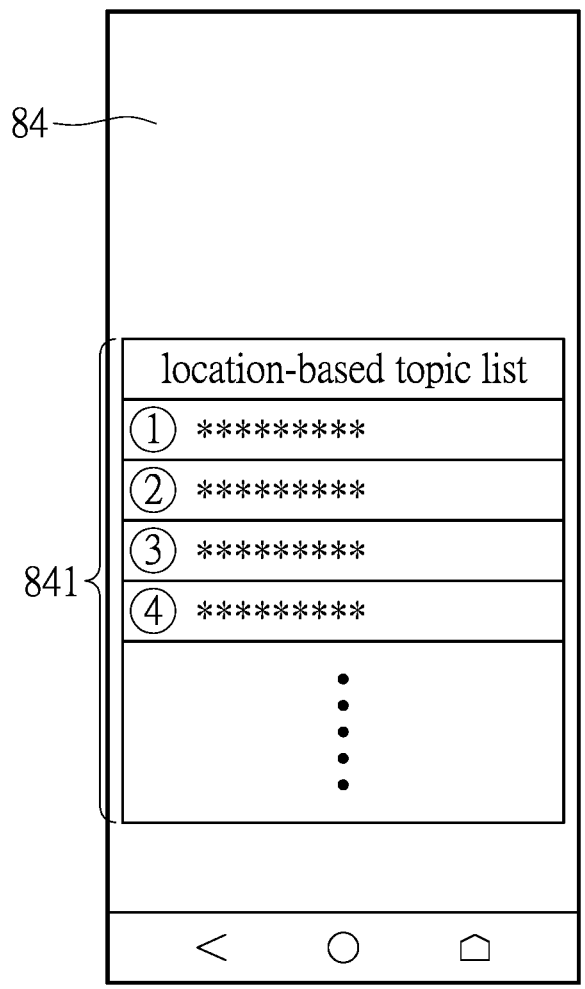

According to one embodiment of the present disclosure, after the location-based topic is created, in addition to marking the location-based digital content linking icons 801 on the graphical user interface 80 as exemplarily shown in FIG. 8C, the user interface can use a list page 84 to show the one or more location-based topics in a list as shown in FIG. 8D. In the exemplary example, multiple location-based topics 841 are listed in a list, and the links of the location-based topics can be images or texts that are provided for the user to click on to enter a topic page.

Figure 5:
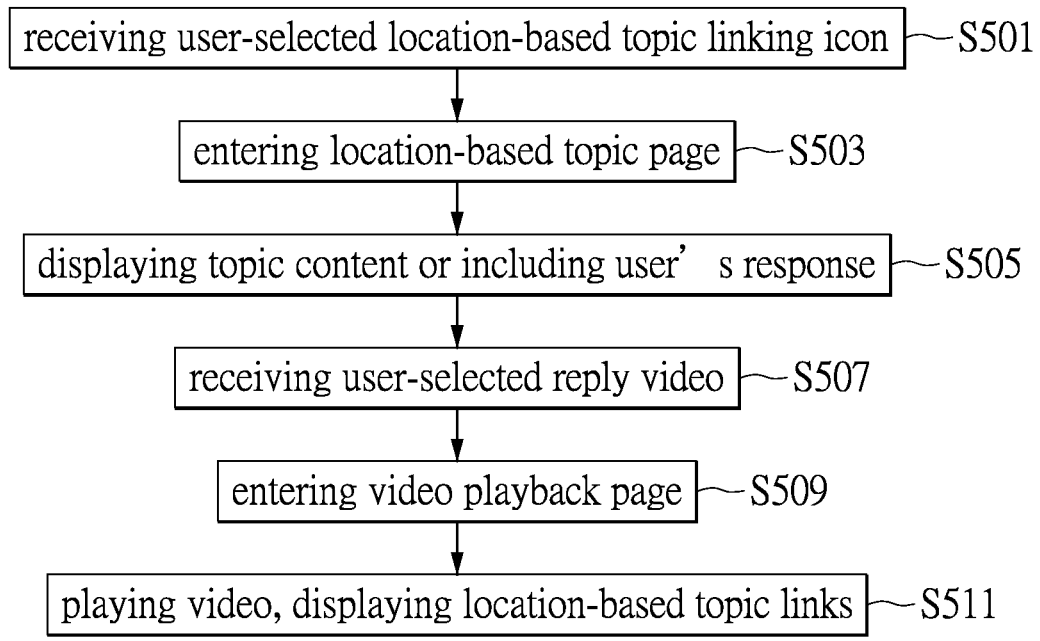
FIG. 5 is a flowchart illustrating a process of entering a location-based topic page according to one embodiment of the present disclosure.
Figure 9A:
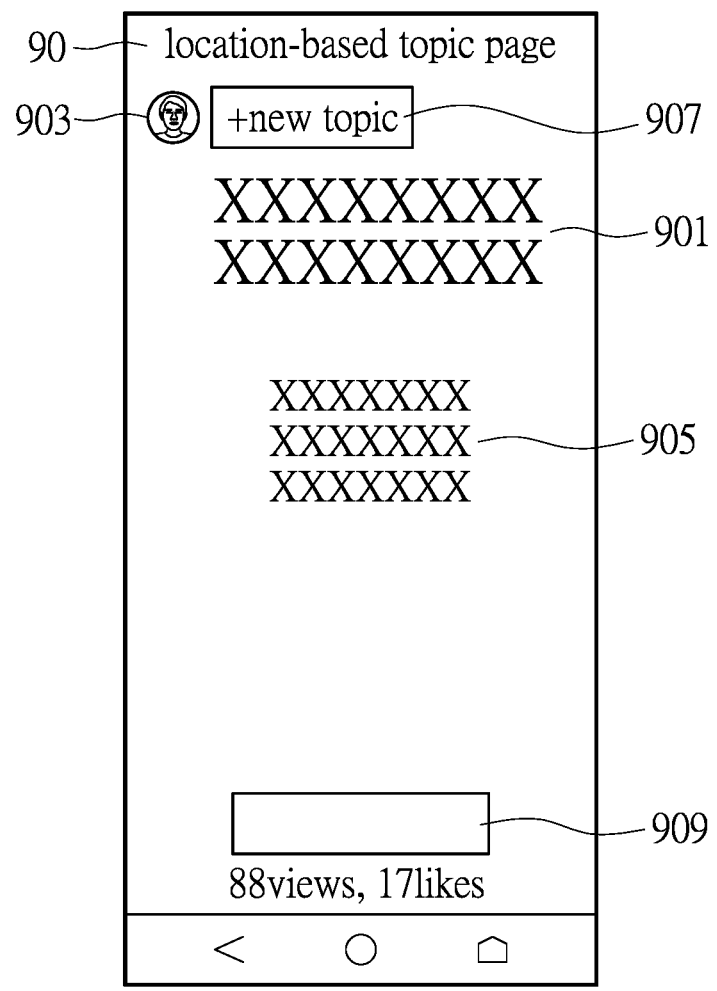
FIG. 9A to FIG. 9B are schematic diagrams depicting a location-based topic page according to one embodiment of the present disclosure.
Figure 9B:
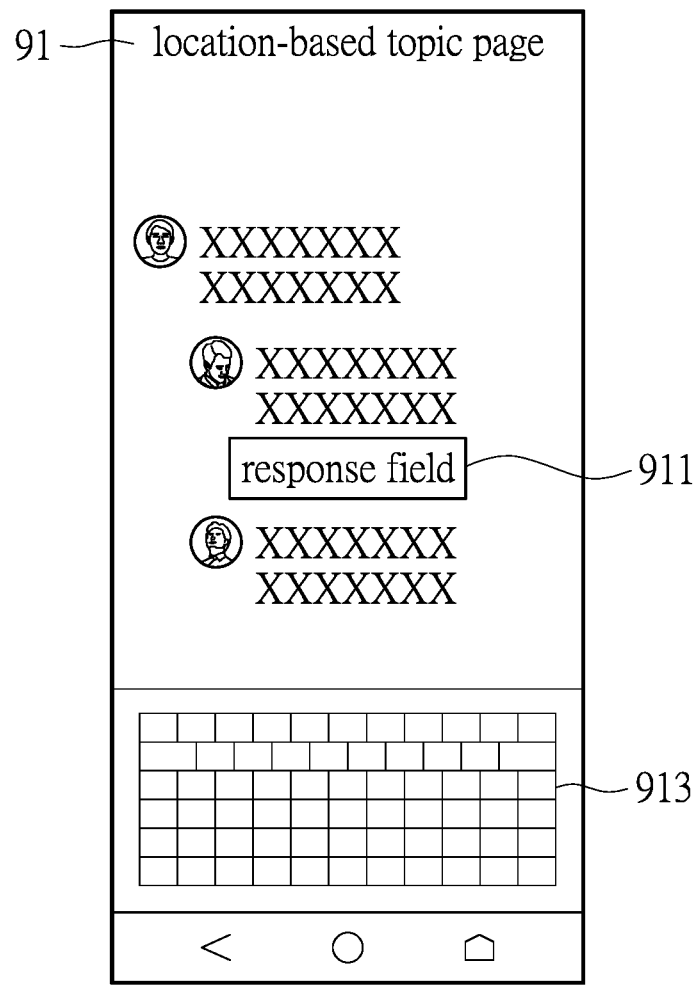

Reference is made to FIG. 5, in conjunction with the schematic diagrams of FIG. 9A to FIG. 9B, and FIG. 5 is a flowchart illustrating a process of entering a location-based topic page according to one embodiment of the present disclosure. When a user browses the digital contents within a geographic range, the geographic data is transmitted to a serving system at any time. The serving system compares the geographic data with the database in order to retrieve the location-based digital contents and the location-based topics within the geographic range. When the location-based topics are retrieved by the serving system, the relevant location-based topic linking icons and the descriptions are pushed to the user device and shown on the user interface. Similarly, the links of the location-based topics can be shown as a list on the user interface and provided for the user to click on to enter one of the location-based topic pages.

When the user clicks on one of the links of the location-based topics, the serving system receives a message of the location-based topic selected by the user (step S501). The user then enters the location-based topic page as displayed by the browser program executed in the user device (step S503). The serving system pushes the content of the location-based topic and one or more responses to the user device (step S505). It should be noted that, the one or more responses pushed by the serving system are based on a matching result with a user preference. Reference is made to FIG. 9A, which is a schematic diagram depicting a location-based topic page 90 having a location-based topic 901 that includes one or more responses 905 made by other users. In addition to browsing the contents of the location-based topic, the user can respond to one of the responses 905. According to one of the embodiments of the present disclosure, when the one or more responses 905 are shown on the user interface, the serving system performs a filtering process that is a software process for filtering out the contents that fail to match a rule set by the serving system. For example, the contents failing to match the rule can be an unrelated content, a blank content, a content having violence implications, or a content violating public order, etc. Afterwards, the one or more responses are sorted according to one or more sorting conditions. In the diagram, the responses 905 are sorted, and the sorting conditions can be assigned with weights for sorting the responses 905. It should be noted that the sorting conditions can include, but not limited to, history of the user that produces the response (i.e., quality of the content responding to the response), number of likes of the response, time of the response, and/or the score of the response that matches with the user preference. The sorting conditions can be weighted and then applied to the sorting.

The information shown on the location-based topic page 90 of FIG. 9A includes the location-based topic 901, the response 905, and a user icon 903 of the user that initiates the location-based topic 901. The response 905 can be in form of an image, a text, a sound or a video. A text or a graph can be used to prompt the user browsing this page to initiate a new topic 907 by a function shown on the page. A response field 909 is provided at the bottom of the page for the user to respond to the location-based topic 901. The user can respond to the location-based topic 901 with an image, a text, a sound or a video.

Figure 10:
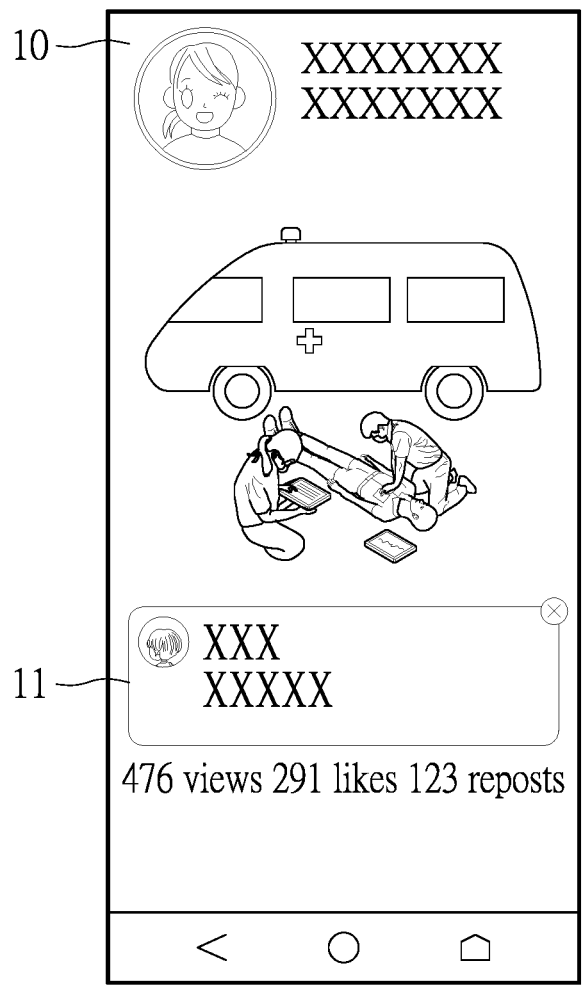
FIG. 10 is a schematic diagram depicting a playback page for playing a digital content and a link used to enter a corresponding location-based topic page according to one embodiment of the present disclosure.

When the user browses each of the responses 905 on the location-based topic page 90, the user can click on a video if the responses 905 include the video (step S507). When the serving system receives the clicking action, the relevant video is transmitted to the user device, and a video playback page is entered (step S509). Reference is made to FIG. 10, which is a schematic diagram depicting the playback page in one embodiment of the present disclosure, and the video is played on the video playback page. According to one of the embodiments of the present disclosure, one or more other videos that match with the classification of the video or the user preference can be continuously played. Further, more information of the location-based topics that correlate with the video can also be shown on the video playback page (step S511). The information as shown on the video playback page includes linking information of the location-based topics.

FIG. 9B is another schematic diagram depicting a location-based topic manipulates the browser program to browse a next location-based topic page 91. With a user device having a touch-sensitive screen as an example, when browsing the above-mentioned location-based topic page 90, the user can switch to the next location-based topic page 91 by a right-to-left swiping gesture. Alternatively, when the user browses the location-based topic page 90, the browser program starts a timer and switches to the next location-based topic page 91 for the user to automatically view the other responses when a time is up. The user can respond to one of the responses with a response field 911 by a virtual keyboard 913. The response is then transmitted to the serving system for using a database index to link to the corresponding response.

FIG. 10 is a schematic diagram depicting a playback page 10 of a digital content in one embodiment of the present disclosure. When the user browses a video, the playback page 10 shows a corresponding location-based topic information 11 if the video that is played is a response to a location-based topic. The location-based topic information 11 can be a digest relevant to the responses to the location-based topic and is used to attract the other user to click on to join a topic of discussion.

It should be noted that, the graphical user interface of the present disclosure is not limited by the above embodiments.

Figure 6:
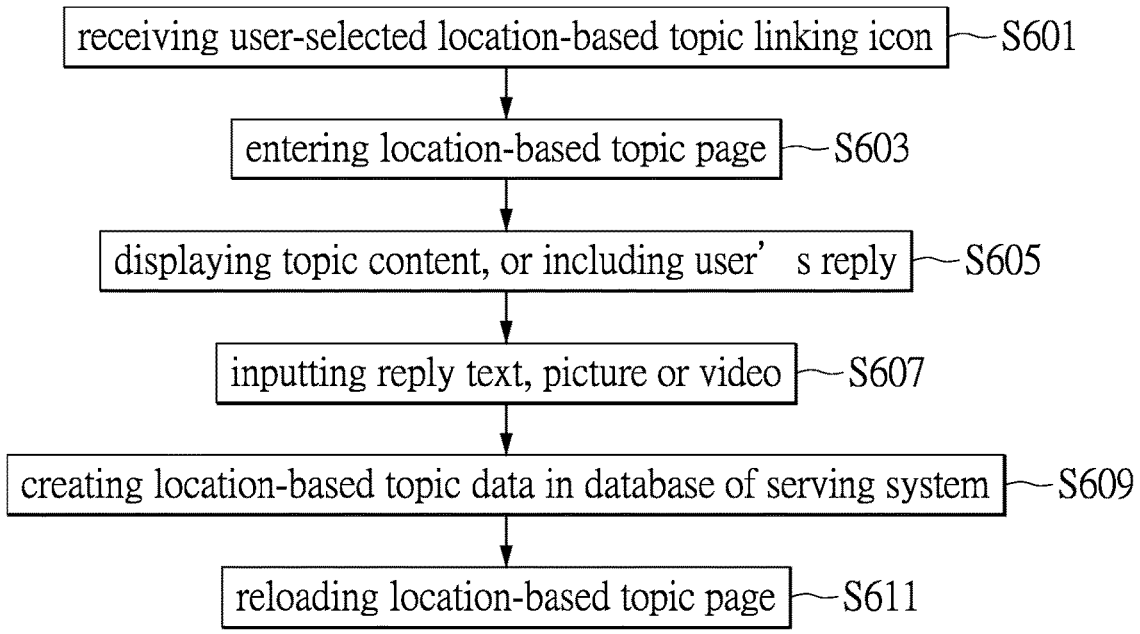
FIG. 6 is a flowchart illustrating a process of replying a location-based topic in one embodiment of the present disclosure.

FIG. 6 is a flowchart illustrating a process of operation between the browser program and the serving system when replying to a location-based topic according to one embodiment of the present disclosure.

In the beginning, such as the flowchart shown in FIG. 5, the user clicks on a location-based topic linking icon on a graphical user interface, and the serving system receives a signal of selection (step S601). The browser program enters a location-based topic page (step S603), which shows a topic content or includes responses made by users (step S605).

Afterwards, the user can input a text, an image, or a video to respond to the topic on the location-based topic page to make a response (step S607). After the response is made, a location-based topic data is created in the database of the serving system (step S609). When the browser program receives the updated location-based topic content from the serving system, the location-based topic page is reloaded (step S611).

The user can initiate a location-based topic through the location-based topic page, and respond to one of the location-based topics selected by the user in the location-based topic page. The location-based topics and every response to each of the location-based topics are analyzed by a learning algorithm and classified for matching with the user preference.

Figure 7:
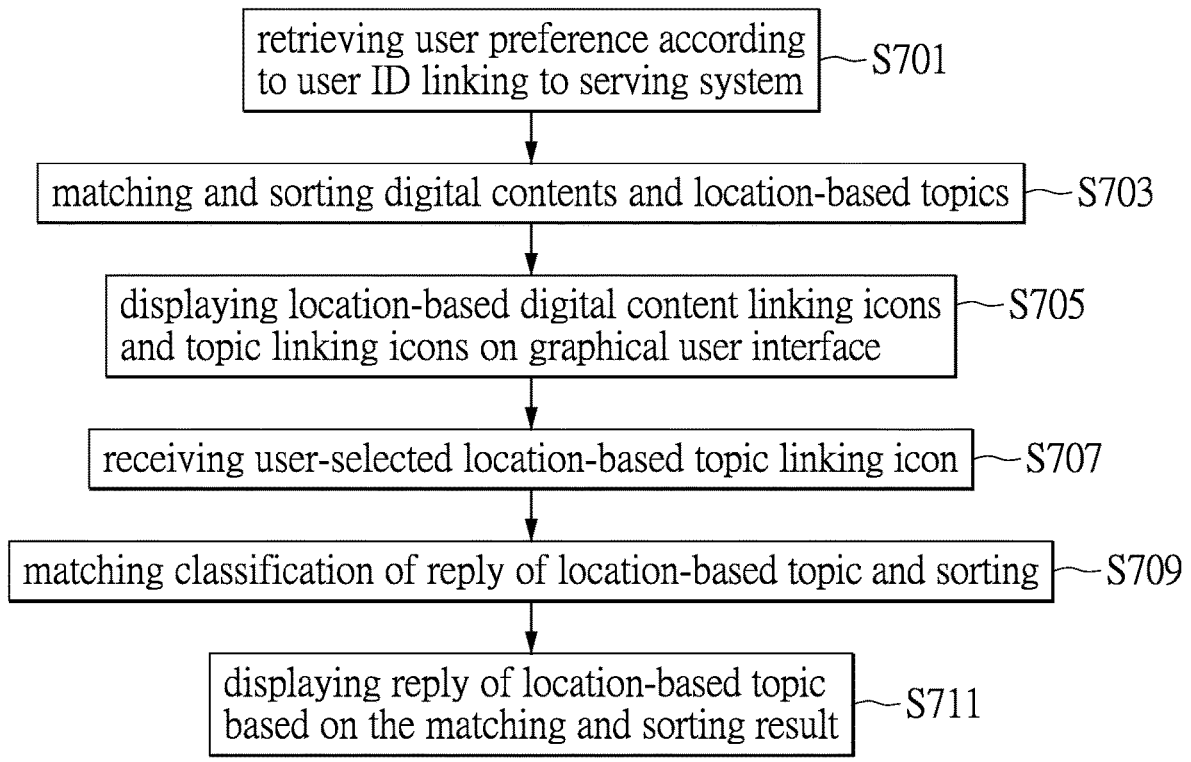
FIG. 7 is a flowchart illustrating a process of showing the sorted location-based topics according to one embodiment of the present disclosure.

Further, when the user browses a certain geographic range by the browser program, the serving system queries the database to retrieve multiple location-based topics within the geographic range or multiple location-based topics at the same location. Therefore, the system sorts the topics based on the user preference. The location-based topics that match with the user preference are provided to be displayed on the graphical user interface. Reference is made to FIG. 7, which is a flowchart illustrating a process of showing the sorted location-based topics according to one embodiment of the present disclosure.

In the flowchart, such as in step S701, the serving system obtains a user ID from messages to be transmitted when the user manipulates the browser program. The serving system obtains the user preference that is learned by a learning algorithm by querying a database according to the user ID. The process of establishing a user preference can be referred to in the flowchart as illustrated in FIG. 2. When a geographic range that is browsed covers multiple location-based digital contents and location-based topics, a matching process and a sorting process can be introduced. When the digital content linking icons and the location-based topic linking icons are provided by the serving system, such as in step S703, a software procedure running in the serving system is used for matching and sorting the digital contents and the location-based topics according to the user preference.

After the abovementioned matching and sorting performed by the browser program executed in the user device, such as in step S705, multiple digital content linking icons and the location-based topic linking icons are shown on the graphical user interface according to a result of the matching and sorting. The user then clicks on one of the interested location-based topic linking icons, such as in step S707, the serving system receives a selection signal when the user clicks on one of the location-based topic linking icons. In step S709, if the selected location-based topic includes multiple responses, the serving system can sort the responses to this location-based topic when needed according to a classification that is generated by matching the user preference with the responses to this location-based topic. Afterwards, such as in step S711, the browser program displays the responses to the location-based topic according to the result of matching and sorting.

In one application scenario, the user selects a geographic location via the graphical user interface and initiates a location-based topic at the geographic location. After the location-based topic is created, a linking icon linked to the location-based topic is marked at the geographic location on the user interface. The linking icon allows other users to join the topic when the other users browse the geographic range covering the geographic location. The location-based topic can be a topic about the geographic location, by which the user can inquire the other network users or friends in a social media questions regarding the geographic location. For example, the user may initiate a topic including a question regarding interesting spots of the geographic location for recreation, transportation to reach the geographic location, or weather of the geographic location, so that the other users may interactively respond to the question.

In conclusion, according to the above embodiments relating to the method and the system for initiating a location-based topic, the method provides an interactive mechanism that allows a user to initiate a location-based topic via a user interface while browsing the location-based digital contents. Therefore, the other users can view and respond to various location-based topics on the user interface so as to perform interaction via the location-based topics. The method is especially applicable to a social media for allowing the users to interact with each other via the location-based topics in addition to sharing pictures, texts, audios, and videos.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for initiating a location-based topic, performed by a serving system providing a database, comprising:

receiving, by the serving system, a signal of initiating a location-based topic that is initiated for a user to interact with other users via a user interface from a user device, wherein the location-based topic at least correlates to a user ID and a geographic data that is referred to for a browser program executed in the user device to browse a location data within a geographic range, and the database records a plurality of user identification data relating to user IDs of multiple users, files of digital contents uploaded by the multiple users, and correlations between the location-based topic and the geographic data and between the location-based topic and the user ID;

establishing data of the location-based topic in the database of the serving system;

marking a link of the location-based topic that correlates with the geographic data on the user interface of the user device; and pushing a content of the location-based topic and one or more responses relating to the location-based topic while entering a location-based topic page if the link of the location-based topic is selected;

wherein the browser program executed in the user device is used to display a prompt message for prompting the user to initiate the location-based topic via the user interface; and wherein the browser program starts a topic page after the user clicks on the prompt message, and the topic page allows the user to input the geographic data and a topic content in the topic page so as to initiate the location-based topic; when the geographic range covers multiple ones of the location-based topics or the location-based topic includes multiple responses, the one or more location-based topics or the one or more responses in the location-based topic are matched with a user preference based on a classification of the multiple location-based topics or the multiple responses; and, when the one or more responses of the location-based topic are displayed, a filtering process is performed in the serving system for excluding one or more unrelated contents, and the one or more responses are sorted according to one or more sorting conditions or a weight assigned to each of the sorting conditions.

2. The method according to claim 1, wherein, when the serving system receives the geographic data transmitted by the user device, the serving system queries the database according to the geographic data and obtains one or more location-based digital contents within the geographic range for providing one or more digital content linking icons corresponding to the one or more digital contents and marked on the user interface of the user device.

3. The method according to claim 1, wherein one of the responses is a video, and a playback page is entered by clicking on the video, and wherein the playback page displays information of the location-based topic correlated to the video.

4. The method according to claim 3, wherein, after the video is played in the playback page, one or more further videos that relate to the classification of the video or match with the user preference are continuously played.

5. The method according to claim 1, wherein the user interface is a graphical user interface that uses an electronic map as a background, and the link of the location-based topic is an icon marked on the electronic map.

6. The method according to claim 1, wherein the user interface adopts a list to show one or more location-based topic pages, and the link of the location-based topic is an icon or a text.

7. A system for initiating a location-based topic, comprising:

a serving system, providing a database; and a browser program, executed in a user device, for initiating a user interface;

wherein the serving system performs a method for initiating the location-based topic that is initiated for a user to interact with other users, and wherein the method includes:

receiving a signal of initiating the location-based topic via the user interface from a user device, wherein the location-based topic at least correlates to a user ID and a geographic data that is referred to for a browser program executed in the user device to browse a location data within a geographic range, and the database records a plurality of user identification data relating to user IDs of multiple users, files of digital contents uploaded by the multiple users, and correlations between the location-based topic and the geographic data and between the location-based topic and the user ID;

establishing data of the location-based topic in the database of the serving system;

marking a link of the location-based topic on the user interface of the user device; and pushing a content of the location-based topic and one or more responses relating to the location-based topic according to a matching result with a user preference while entering a location-based topic page if the link of the location-based topic is selected;

wherein the browser program executed in the user device is used to display a prompt message for prompting the user to initiate the location-based topic via the user interface; and wherein the browser program starts a topic page after the user clicks on the prompt message, and the topic page allows the user to input the geographic data and a topic content in the topic page so as to initiate the location-based topic: when the geographic range covers multiple ones of the location-based topics or the location-based topic includes multiple responses, the one or more location-based topics or the one or more responses in the location-based topic are matched with the user preference based on a classification of the multiple location-based topics or the multiple responses; and, when the one or more responses of the location-based topic are displayed, a filtering process is performed in the serving system for excluding one or more unrelated contents, and the one or more responses are sorted according to one or more sorting conditions or a weight assigned to each of the sorting conditions.

8. The system according to claim 7, wherein the browser program is an application that is used to browse a social media, and the location-based topic is initiated for the user to interact with other users in the social media.

9. The system according to claim 7, wherein the user interface is a graphical user interface that uses an electronic map as a background, and the link of the location-based topic is an icon marked on the electronic map.

10. The system according to claim 7, wherein the user interface adopts a list to show one or more location-based topic pages, and the link of the location-based topic is an icon or a text.

* * * * *